(12) United States Patent
Masiyowski et al.

(10) Patent No.: US 8,730,871 B2
(45) Date of Patent: *May 20, 2014

(54) SYSTEM AND METHOD FOR PROVIDING VOICE COMMUNICATIONS OVER A MULTI-LEVEL SECURE NETWORK

(75) Inventors: John F. Masiyowski, Oak Hill, VA (US); Raymond A. Magon, Fairfax, VA (US); Michael O. Tierney, Ashburn, VA (US); Robert L. Marchant, Severn, MD (US)

(73) Assignee: Raytheon Company, Waltham, MA (US)

( * ) Notice: Subject to any disclaimer, the term of this patent is extended or adjusted under 35 U.S.C. 154(b) by 802 days.

This patent is subject to a terminal disclaimer.

(21) Appl. No.: 12/686,814

(22) Filed: Jan. 13, 2010

(65) Prior Publication Data

US 2010/0296444 A1 Nov. 25, 2010

Related U.S. Application Data

(60) Provisional application No. 61/216,979, filed on May 22, 2009.

(51) Int. Cl.
*H04W 4/00* (2009.01)
(52) U.S. Cl.
USPC .......................... 370/328; 370/465; 370/493
(58) Field of Classification Search
USPC ......... 370/328, 335–336, 338, 352–356, 389, 370/392, 400–401, 465–466, 474, 493–494
See application file for complete search history.

(56) References Cited

U.S. PATENT DOCUMENTS

| 4,981,371 | A | 1/1991 | Gurak et al. |
| 5,577,209 | A | 11/1996 | Boyle et al. |
| 5,974,142 | A | 10/1999 | Heer et al. |
| 6,122,359 | A | 9/2000 | Otto et al. |
| 6,243,376 | B1 | 6/2001 | Ng et al. |
| 6,392,999 | B1 | 5/2002 | Liu et al. |
| 6,411,965 | B2 | 6/2002 | Klug |
| 6,445,931 | B1 * | 9/2002 | Lee .............................. 455/555 |
| 6,728,784 | B1 | 4/2004 | Mattaway |

(Continued)

FOREIGN PATENT DOCUMENTS

| GB | 2 264 210 | 8/1993 |
| WO | WO 01/37585 | 5/2001 |

OTHER PUBLICATIONS

PCT Notification of Transmittal of the Intl. Search Report and the Written Opinion of the Intl. Searching Authority, or the Declaration mailed Oct. 1, 2010, re PCT/US2010/034629 filed May 13, 2010.

(Continued)

*Primary Examiner* — Kevin Mew
(74) *Attorney, Agent, or Firm* — Daly, Crowley, Mofford & Durkee, LLP (57) ABSTRACT

According to one embodiment, a communication network includes an analog voice bridge coupled to two secure network domains that each have a differing security level. The analog voice bridge includes two codecs that are coupled together through an analog voice line that transfers analog voice signals. The analog voice bridge is coupled to each secure network domain through a network switch that transfers data packet streams from their respective networks to the codecs while restricting data packets that are not associated with the data packet stream.

24 Claims, 5 Drawing Sheets

(56) References Cited

U.S. PATENT DOCUMENTS

| | | | |
|---|---|---|---|
| 6,760,421 | B2 | 7/2004 | Heilmann et al. |
| 6,771,740 | B1 | 8/2004 | Bingel |
| 6,775,273 | B1* | 8/2004 | Kung et al. .............. 370/356 |
| 6,813,264 | B2 | 11/2004 | Vassilovski |
| 6,826,173 | B1* | 11/2004 | Kung et al. .............. 370/352 |
| 6,829,234 | B1 | 12/2004 | Kaplan et al. |
| 6,857,072 | B1 | 2/2005 | Schuster et al. |
| 6,909,708 | B1* | 6/2005 | Krishnaswamy et al. .... 370/352 |
| 6,930,730 | B2 | 8/2005 | Maxon et al. |
| 6,967,958 | B2 | 11/2005 | Ono et al. |
| 7,099,653 | B2 | 8/2006 | Creamer et al. |
| 7,127,048 | B2 | 10/2006 | Bremer et al. |
| 7,133,514 | B1 | 11/2006 | Cook et al. |
| 7,139,263 | B2 | 11/2006 | Miller et al. |
| 7,149,208 | B2 | 12/2006 | Mattaway et al. |
| 7,209,473 | B1* | 4/2007 | Mohaban et al. .......... 370/352 |
| 7,221,660 | B1 | 5/2007 | Simonson et al. |
| 7,298,702 | B1* | 11/2007 | Jones et al. .............. 370/235 |
| 7,343,177 | B2 | 3/2008 | Seshadri et al. |
| 7,415,005 | B1 | 8/2008 | Macha et al. |
| 7,508,310 | B1 | 3/2009 | Light et al. |
| 7,512,967 | B2 | 3/2009 | Sentoff |
| 7,567,555 | B1 | 7/2009 | Ricciardi et al. |
| 7,571,317 | B1 | 8/2009 | Vilhuber |
| 7,626,951 | B2 | 12/2009 | Croy et al. |
| 7,634,533 | B2 | 12/2009 | Rudolph et al. |
| 7,660,575 | B2 | 2/2010 | Yeap et al. |
| 7,693,131 | B2 | 4/2010 | Kaplan et al. |
| 7,701,974 | B2 | 4/2010 | Mayer et al. |
| 7,711,828 | B2 | 5/2010 | Shew et al. |
| 7,782,826 | B2* | 8/2010 | Olivier et al. ............ 370/338 |
| 7,899,038 | B2* | 3/2011 | Ulybin .................... 370/353 |
| 2002/0097708 | A1 | 7/2002 | Deng |
| 2002/0129236 | A1 | 9/2002 | Nuutinen |
| 2003/0018918 | A1 | 1/2003 | Natsuno et al. |
| 2003/0051130 | A1 | 3/2003 | MeLampy et al. |
| 2003/0128696 | A1 | 7/2003 | Wengrovitz et al. |
| 2003/0167394 | A1 | 9/2003 | Suzuki et al. |
| 2003/0224807 | A1 | 12/2003 | Sinha et al. |
| 2004/0008423 | A1 | 1/2004 | Driscoll, Jr. et al. |
| 2004/0034723 | A1 | 2/2004 | Giroti |
| 2004/0179555 | A1 | 9/2004 | Smith |
| 2004/0203799 | A1 | 10/2004 | Siegel |
| 2005/0257052 | A1 | 11/2005 | Asai et al. |
| 2006/0020800 | A1 | 1/2006 | Holden et al. |
| 2006/0029050 | A1* | 2/2006 | Harris et al. ............ 370/356 |
| 2006/0230143 | A1 | 10/2006 | Ziegler et al. |
| 2007/0250921 | A1 | 10/2007 | LiVecchi |
| 2007/0297588 | A1* | 12/2007 | Benco et al. .............. 379/159 |
| 2008/0008312 | A1 | 1/2008 | Ganesamoorthi et al. |
| 2008/0049753 | A1* | 2/2008 | Heinze et al. ............ 370/392 |
| 2009/0271858 | A1* | 10/2009 | Cooke et al. .............. 726/12 |
| 2010/0245107 | A1 | 9/2010 | Fulker et al. |
| 2010/0260173 | A1* | 10/2010 | Johnson .................. 370/356 |

OTHER PUBLICATIONS

Masiyowski et al., U.S. Appl. No. 12/686,886, filed Jan. 13, 2010, entitled "Analog Voice Bridge,".
Masiyowski et al., U.S. Appl. No. 12/686,946, filed Jan. 13, 2010, entitled "User Interface for Providing Voice Communications over a Multi-Level Secure Network,".
PCT Notification of Transmittal of the Intl. Search Report and the Written Opinion of the Intl. Searching Authority, or the Declaration mailed Oct. 1, 2010, re PCT/US2010/034823 filed May 14, 2010.
PCT Notification of Transmittal of the Intl. Search Report and the Written Opinion of the Intl. Searching Authority, or the Declaration mailed Oct. 5, 2010, re PCT/US2010/034824 filed May 14, 2010.
Office Action dated Jul. 9, 2012 for GB Appl. No. 1119955.1, 2 pages.
Response to Office Action dated Jul. 9, 2012, filed Sep. 10, 2012 for GB Appl. No. 1119955.1, 5 pages.
Examination Report dated Dec. 8, 2011 (1 p.) for Patent Application GB1119955.1, filed Nov. 18, 2011.
Response to Examination Report of Dec. 8, 2011, including claims and amended claims (12 p.) filed May 1, 2012 for Patent Application GB1119955.1, filed Nov. 18, 2011.
Examination Report dated Jul. 9, 2012 (1 p.) and associated letter to UK Associate dated Jul. 9, 2012 (1 p.) for Patent Application GB1119955.1, filed Nov. 18, 2011.
U.S. Appl. No. 12/686,886, filed Jan. 13, 2010.
PCT/US2010/034823 Application as filed on May 14, 2010 (31 p.).
PCT/US2010/034823 Published Application with Int'l Search Report, dated Nov. 25, 2010, 34 p.
PCT/US2010/034823 Notification of Transmittal of Int'l Search Report and Written Opinion of Int'l Search Authority, dated Oct. 1, 2010, 15 p.
PCT/US2010/034823 Written Opinion of the Int'l Search Authority, 7 p., dated Nov. 22, 2011.
PCT/US2010/034823 International Preliminary Report on Patentability, 8 p., dated Nov. 22, 2011.
PCT/US/034824 Application as filed on May 14, 2010, 42 p.
PCT/US/034824 Published Application with Int'l Search Report, 46 p., dated Nov. 24, 2010.
PCT/US/034824 Written Opinion of the Int'l Search Authority, 7 p., dated Nov. 22, 2011.
PCT/US/034824 Int'l Preliminary Report on Patentability, 8 p., dated Nov. 22, 2011.
Letter dated Dec. 4, 2012 enclosing Official Notification of Grant of UK patent application No. GB1119955.1, issued Dec. 26, 2012, 3 pages.
Response to Office Action dated Sep. 17, 2012 for U.S. Appl. No. 12/686,946, filed Jan. 13, 2012, 19 pages.
U.S. Appl. No. 12/686,946, filed Jan. 13, 2010.
Office Action response filed on Oct. 22, 2012 for U.S. Appl. No. 12/686,886, 11 pages.
Final Office Action dated Jun. 5, 2013 for U.S. Appl. No. 12/686,946, filed Jan. 13, 2012, 21 pages.
Final Office Action dated Aug. 30, 2013; for U.S. Appl. No. 12/686,886, 26 pages.
U.S. Appl. No. 12/686,886, filed Jan. 13, 2010; 200 pages, Part 1 of 12.
U.S. Appl. No. 12/686,886, filed Jan. 13, 2010; 200 pages, Part 2 of 12.
U.S. Appl. No. 12/686,886, filed Jan. 13, 2010; 200 pages, Part 3 of 12.
U.S. Appl. No. 12/686,886, filed Jan. 13, 2010; 200 pages, Part 4 of 12.
U.S. Appl. No. 12/686,886, filed Jan. 13, 2010; 200 pages, Part 5 of 12.
U.S. Appl. No. 12/686,886, filed Jan. 13, 2010; 200 pages, Part 6 of 12.
U.S. Appl. No. 12/686,886, filed Jan. 13, 2010; 200 pages, Part 7 of 12.
U.S. Appl. No. 12/686,886, filed Jan. 13, 2010; 200 pages, Part 8 of 12.
U.S. Appl. No. 12/686,886, filed Jan. 13, 2010; 200 pages, Part 9 of 12.
U.S. Appl. No. 12/686,886, filed Jan. 13, 2010; 200 pages, Part 10 of 12.
U.S. Appl. No. 12/686,886, filed Jan. 13, 2010; 200 pages, Part 11 of 12.
U.S. Appl. No. 12/686,886, filed Jan. 13, 2010; 8 pages, Part 12 of 12.
Final Office Action in U.S. Appl. No. 12/686,886 dated Aug. 30, 2013, 26 pages.
Response to Final Office Action in U.S. Appl. No. 12/686,886, filed Nov. 25, 2013, 13 pages.
Office Action in U.S. Appl. No. 12/686,946 dated Sep. 13, 2013, 20 pages.
Reponse filed Dec. 11, 2013 to Office Action in U.S. Appl. No. 12/686,946 dated Sep. 13, 2013, 21 pages.

* cited by examiner

SYSTEM AND METHOD FOR PROVIDING VOICE COMMUNICATIONS OVER A MULTI-LEVEL SECURE NETWORK

RELATED APPLICATIONS

This application claims priority to U.S. Provisional Patent Application Ser. No. 61/216,979, entitled "METHOD AND SYSTEM FOR CREW COMMUNICATIONS USING MULTI-LEVEL REAL-TIME VOICE OVER IP INTERCOM," which was filed on May 22, 2009. U.S. Provisional Patent Application Ser. No. 61/216,979 is hereby incorporated by reference.

GOVERNMENT RIGHTS

This invention was made with government support under government contract number F09604-03-D-0007, Crew Communications. The Government has certain rights in this invention.

TECHNICAL FIELD OF THE DISCLOSURE

This disclosure generally relates to communication networks, and more particularly, to a system and method for providing voice communications over a multi-level secure network.

BACKGROUND OF THE DISCLOSURE

Information provided by network computing systems may incorporate various levels of security for protection of information they process from illicit use or unauthorized access. Multi-level security (MLS) is one type of secure architecture in which differing processes process information at differing security levels according to a one or more authorization levels associated with each user. Multiple independent levels of security (MILS) is another type of secure computing architecture in which processes process information in separately and distinctly from one another according to their assigned security level.

SUMMARY OF THE DISCLOSURE

According to one embodiment, a communication network includes an analog voice bridge coupled to two secure network domains that each have a differing security level. The analog voice bridge includes two codecs that are coupled together through an analog voice line that transfers analog voice signals. The analog voice bridge is coupled to each secure network domain through a network switch that transfers data packet streams from their respective networks to the codecs while restricting data packets that are not associated with the data packet stream.

Some embodiments of the disclosure may provide numerous technical advantages. For example, one embodiment of the communication network may provide simultaneous communication of terminals with others that may have differing levels of security. Simultaneous communication is provided by an analog voice bridge that transfers analog voice communications while restricting the movement of data packets from one secure network domain to the other. Thus, a user may communicate one or more voice messages with another terminal configured on his or her secure network domain simultaneously while communicating one or more other messages with another terminal configured on another secure network domain.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

Secure enterprise management of information processed on network computing systems may be accomplished by a multi-level security (MLS) architecture or a multiple independent levels of security (MILS) architecture. The multi-level security architecture usually incorporates a multi-tiered security scheme in which users have access to information managed by the enterprise based upon one or more authorization levels associated with each user. For example, enterprises, such as the government, utilize a multi-level security scheme that includes various security levels, such as unclassified, classified, secret, and top secret security levels, and may include one or more releasability levels, such as a sensitive compartmented information (SCI), releasable (REL), and/or no foreign (NF) releasability levels.

Various protocols, such as a voice over Internet protocol (VoIP) have been established to provide voice communications over data networks. The voice over Internet protocol provides for conversion of analog voice signals to a digital data stream suitable for transmission over a communication network, and signaling techniques for establishing differing types of voice connections, such as direct calls, conference calls, and other intercom sessions between two or more users. Implementation of voice communications on secure data networks using protocols such as voice over Internet protocol have been accomplished with varying degrees of success. One detrimental aspect of implementing voice communications on secure data networks is that spoken communication may not be inherently labeled in the same manner in which data is typically labeled. Thus, implementation of voice communications on secure data networks has been relegated to multiple independent levels of security architectures in which it is often limited to use with within the confines of its particular security level domain.

Figure 1:
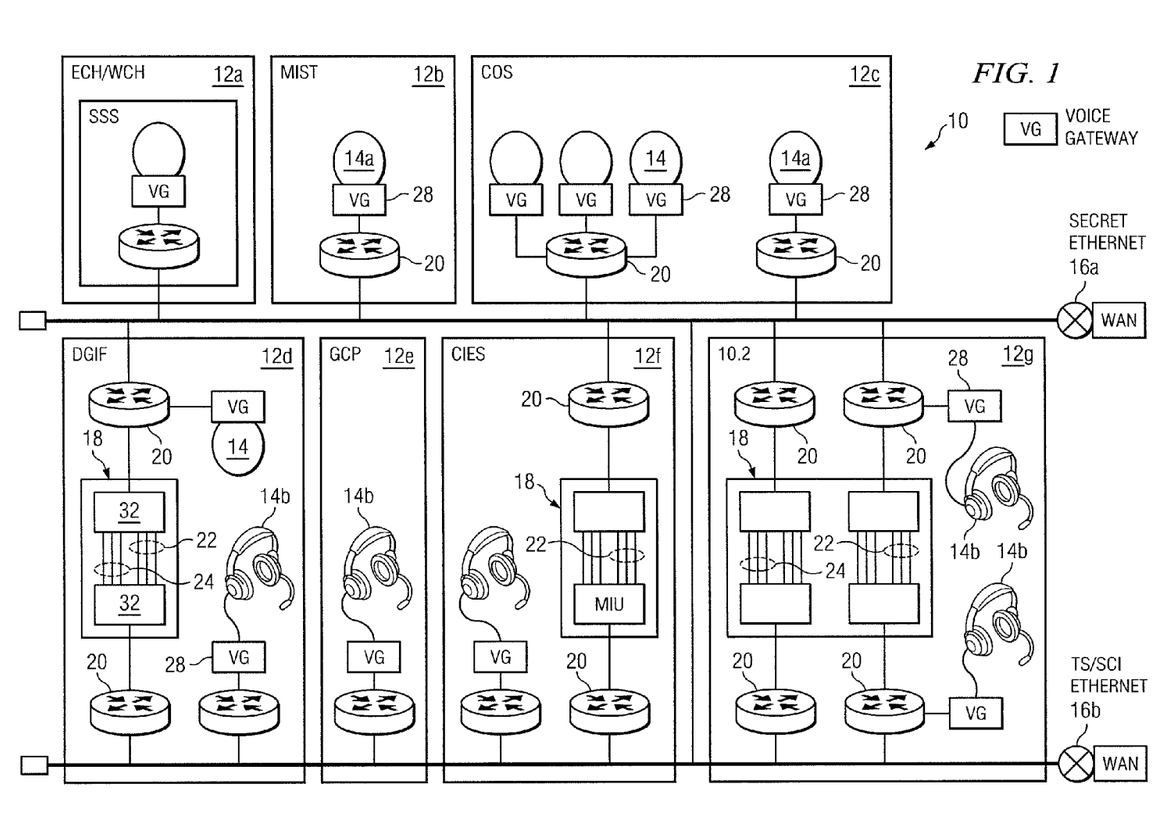
FIG. 1 is a diagram showing one embodiment of a multi-level security network that may benefit from the teachings of the present disclosure.

FIG. 1 is a diagram showing one embodiment of a multi-level security network 10 that may benefit from the teachings of the present disclosure. The particular multi-level security network 10 shown includes several sub-networks 12 or enclaves of the global information grid that may be managed by the Department of Defense (DoD). Sub-networks 12 are often referred to as enclaves in which members of each enclave may readily communicate with one another through established terminals 14a or 14b. The global information grid has been established by the Department of Defense to provide a common information backbone for its various participating members. Sub-networks 12 may include a Senior Span Segment (SSS) sub-network 12a, a Mobile Interoperable Surface Terminal (MIST) sub-network 12b, a Communications Segment (COS) sub-network 12c, a Deployable Ground Intercept System (DGIF) sub-network 12d, a Ground Control Processor (GCP) sub-network 12e, a Common Imagery Exploitation (CIES) sub-network 12f, and a 10.2 sub-network 12g.

Multi-level security network 10 includes multiple secure network domains 16a and 16b that may be classified with a security level/releasiblity level that differs from one another. As shown, secure network domain 16a is classified according to a secret security level while secure network domain 16b is classified according to a top secret/sensitive compartmented information (TS/SCI) security level. In other embodiments, secure network domains 16a or 16b may be classified according to any security/releasiblity level that implements a portion of a multi-level security network. For example, secure network domain 16a or 16b may be a classified or a non-classified secure network domain of the global information grid.

The United States Department of Defense (DoD) has issued a Director of Central Intelligence Directive 6/3 (DCID 6/3) entitled "Protecting Sensitive Compartmented Information Within Information Systems." The Director of Central Intelligence Directive 6/3 generally includes a set of guidelines for multi-level security networks that include several ascending levels of protection extending from a protection level 0 (PL0) to a protection level 5 (PL5). Specifically, the protection level 4 (PL4) protection level specifies that "The security support structure shall maintain separate execution domains (e.g., address spaces) for each executing process." Thus, to maintain a protection level 4 security level, sub-networks 12 coupled to secure network domain 16a should remain uncoupled from secure network domain 16b such that data packets originating from one secure network domain 16a or 16b is not inadvertently or maliciously routed to the other secure network domain 16b or 16a.

According to the teachings of the present disclosure, voice communications may be provided between secure network domains 16a and 16b by an analog voice bridge 18 and one or more secure network switches 20 coupled between each sub-network 12 and secure network domain 16a or 16b. As will be described in detail below, analog voice bridge 18 includes one or more analog voice lines 22 that convey analog voice signals between secure network domains 16a and 16b while restricting transmission of data packets from one secure network domain 16a or 16b to the other. Analog voice bridge 18 may also include one or more signaling lines 24 for controlling operation of analog voice lines 22. Additionally, some embodiments may provide secure voice communications among secure network domains 16a and 16b having a multi-security level scheme, such as those incorporating security/releasibility levels.

In one embodiment, analog voice line 26 comprises a pair of electrical conducting wires that convey analog voice signals whose voltage is proportional to its amplitude. In other embodiments, analog voice line 26 may include other types of signaling techniques that convey analog voice signals from codec 24a to and from codec 24b. For example, multiple analog voice signals may be multiplexed with one another on analog voice line using a time division multiplex access (TDMA) multiplexing technique. As another example, analog voice line 26 may convey a digital signal stream, such as a T1 signal forming a digital representation of the analog voice signal.

Figure 2:
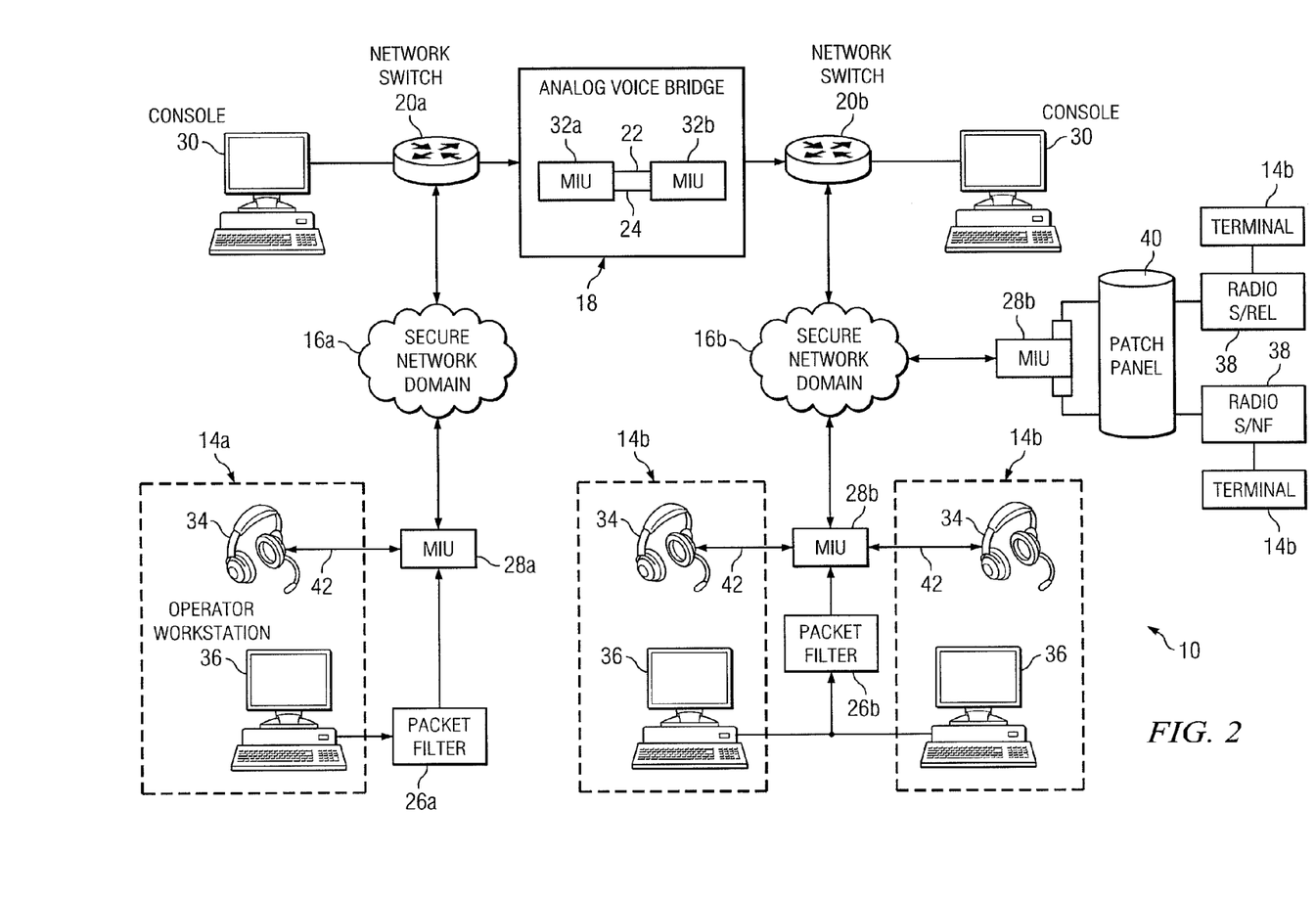
FIG. 2 is a diagram showing several additional elements of the multi-level secure network of FIG. 1.

FIG. 2 is a diagram showing several additional elements of the multi-level secure network 10 of FIG. 1. As shown, multi-level security network 10 includes at least two secure network domains 16a and 16b that are classified at different security levels. In other embodiments, the two secure network domains 16a and 16b may be classified at a similar security level. Secure network domain 16a is coupled to analog voice bridge 18 through a network switch 20a and to one or more terminals 14a through a packet filter 26a and a voice interface gateway 28a, respectively. Respectively, secure network domain 16b is coupled to analog voice bridge 18 through a network switch 20b and to one or more terminals 14b through a packet filter 26b and a voice interface gateway 28b. Analog voice bridge 18 includes two codecs 32a and 32b for converting a data packet stream from its respective secure network domain 16a and 16b to or from an analog voice stream suitable for transmission across analog voice line 22. Each network switch 20a and 20b is coupled to a console 30 for local configuration of its associated network switch 20a or 20b.

Voice interface gateways 28 may be coupled to any suitable type of terminal 14a or 14b. In one embodiment, terminals 14 include a headset portion 34 and a workstation portion 36. Headset portion 34 may include a microphone for generating analog voice signals from audio signals and a speaker for converting audio signals from analog voice signals. Workstation portion 36 includes any suitable computing system that may generate data packets for establishing and maintaining voice call sessions on multi-level security network 10. In one embodiment, workstation portion 36 executes a web browser in which voice communication through packet filter 26 may be restricted to those terminals 14 using their statically assigned IP source addresses as an authorization mechanism. Thus in some embodiments, the security of voice interface gateway 28 may be enhanced by restricting access to only those terminals 14 for which secure communication may be provided using commonly used components with well established security mechanisms, such as a hypertext transfer language secure (HTTPS) protocol. Voice interface gateways 28 may be coupled to terminals 14 in any suitable manner. In one embodiment, voice interface gateway 28 may send and receive analog voice signals through an analog voice line 42 coupled to headset portion 34 of terminal 14, and may send and receive data packet information through packet filter 26a and 26b to workstation portion 36 of terminal 14. The data packet information may be used for controlling voice connections of terminal 14 established through multi-level security network 10.

In another embodiment, voice interface gateway 28 may be coupled to other terminals 14b through one or more wireless networks 38. In this embodiment, a secret/releasable (S/REL) network and a secret/no foreign (S/NF) network are shown; however in other embodiments, other types of wireless networks may be utilized. In some embodiments, a patch panel 40 may be provided to couple analog voice lines and data packet lines between voice interface gateway 28 and wireless networks 38 in an organized manner.

Terminals 14a and 14b described above represent particular communication devices that transfer voice signals through packet networks and wireless networks. In other embodiments, terminals 14a or 14b may be any communication device that transfers voice signals over any type of communication network.

The multi-level security network 10 as shown may provide a defense-in-depth solution for voice communications across secure network domains 16 of a multi-level security architecture. Analog voice bridge 18 provides at least one layer of protection by allowing voice signals to pass while restricting passage of data packets between secure network domains 16. Network switches 20 configured on either end of analog voice bridge 18 provide another level of protection by restricting data packets of their respective secure network domains 16 from accessing analog voice bridge 18 that are not intended for voice communication through analog voice bridge 18. Packet filters 26a and 26b and voice interface gateways 28 provide yet another level of protection by restricting access of terminals 14 and users of those terminals 14 to only those having sufficient authorization to access voice interface gateway 28. Additionally, the various elements of multi-level security network 10 may be configured with other features to provide other levels of protection for ensuring that the integrity of secure network domains 16 are not compromised while implementing voice communications on multi-level security network 10.

Each codec 32a and 32b of analog voice bridge 18 converts data packets from its respective secure network domain 16 to or from an analog voice stream suitable for transmission across analog voice line 22. An example codec 32a or 32b may include an analog to digital converter (ADC) for converting the analog voice stream to digital signal stream, a digital to analog converter (DAC) for converting the digital signal stream to the analog stream, and associated logic for encapsulating or decapsulating the analog voice stream to or from the digital signal stream in packets suitable for transmission over secure network domains 16. Codecs 32a and 32b may also be coupled to one another through one or more signaling lines 24 that control operation of analog signal lines 22, such as providing call setup, call teardown, or other call negotiation procedures.

In one embodiment, codecs 32a and 32b are configured on separate computing systems and coupled together only through analog voice lines 22 and signaling lines 24 such that physical separation according to PL4 requirements may be maintained. Computing systems embodying codecs 32a and 32b may be commercial-off-the-shelf computing systems capable of operating with a standard operating system, such as a Unix, Linux, Windows, or Macintosh operating system. Various elements of codecs 32a and 32b will be described in greater detail below.

Each voice interface gateway 28a and 28b may include a codec for converting analog voice signals to and from a data packet stream suitable for transmission over secure network domains 16, which may be, for example, an Ethernet network. In one embodiment, the codec configured in voice interface gateway 28 may be similar in design and construction to codecs 32a and 32b of analog voice bridge 18. In one embodiment, voice interface gateway 28 includes a commercially available computing system configured with multiple codecs 32a and 32b and marketed under the tradename "Mercury interface Unit", which is available from Trilogy Communications Limited, and located in Andover, Hampshire, United Kingdom.

Voice interface gateway 28 communicates information from terminals 14 to network switch 20 in any suitable manner. In one embodiment, voice interface gateway 28 communicates signaling information with terminals 14 using the transfer control protocol/Internet protocol (TCP/IP) and transfers digital voice signals through secure network domains 16 using a Real-Time Protocol (RTP) and a Session Initiation Protocol (SIP).

Each packet filter 26a and 26b is coupled between workstation portion 36 of terminal 14 and voice interface gateway 28. Packet filters 26a and 26b restrict access by terminal 14 to only those packets that are destined for voice communication control. In many respects, packet filters 26a and 26b may perform functions that are generally similar to a commercial-off-the-shelf firewall. In one embodiment, each packet filter 26a and 26b may store an access control list that includes information associated with terminals 14 approved for voice communication through voice interface gateway 28. Thus, packet filters 26a and 26b may provide another layer of protection for analog voice bridge 18 by implementing a positive inclusion (MAC) policy in which only those terminals 14 that are pre-registered for use via the access control list in packet filter 26a and 26b may be allowed to communicate through voice interface gateway 28.

Packet filters 26a and 26b may be executed on any suitable computing system. For example, packet filter 26a and 26b may be executed on a stand-alone computing system that is separate and distinct from workstation portion 36 of terminal 14 or voice interface gateway 28. As another example, packet filter 26a and 26b may be integrated with workstation portion 36 or voice interface gateway 28 in which data packets may be transferred between packet filter 26a and 26b and workstation portion 36 or voice interface gateway 28 internally.

Console 30 provides user configuration of its associated network switch 20a and 20b and may provide various features for ensuring proper operation of analog voice bridge 18. In one embodiment, console 30 may monitor voice connections communicated through analog voice bridge 18 to ascertain any suspicious activity that may occur through illicit use. For example, console 30 may monitor signaling lines 24 for abnormal signaling sequences that may be attempted, such as repeated call setup attempts in an inordinately short period of time, or other call setup attempts to terminals 14 for which the calling terminal 14 may not be authorized to call. If suspicious activity is detected, console 30 may generate an alarm message that is sent to an appropriate system administrator for further investigation. In one embodiment, console 30 may also include a voice recording mechanism, such as a Stancil recorder or other similar device, that selectively records voice communications transmitted across analog voice bridge 18 for review at a later time. For example, it may be determined through various means that a particular user has been illicitly transmitting or receiving voice communications through analog voice bridge 18. Thus, console 30 may be configured to record further voice communications of that user through analog voice bridge 18 and analyzed at a later time to determine the nature of the communications conducted through analog voice bridge 18.

In one embodiment, console 30 may audit voice communications through analog voice bridge 18. For example, console 30 may perform periodic audits of some or all terminals 14 that access other terminals 14 through analog voice bridge 18. These audits may reveal certain patterns of voice call activity that may deviate from normal accepted usage. In this case, console 30 may generate an alarm message that is sent to an appropriate system administrator for further investigation.

Figure 3:
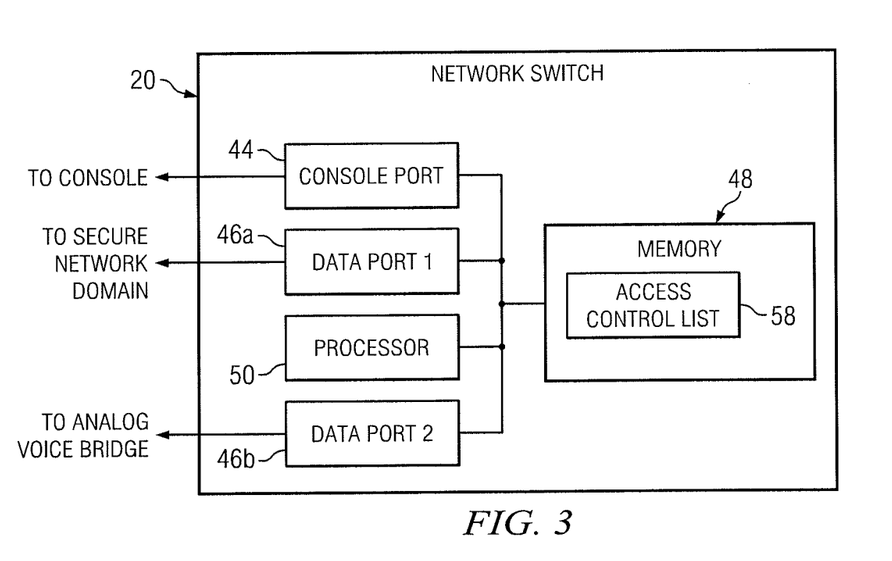
FIG. 3 is a diagram showing several elements of one embodiment of one network switch of FIG. 1.

FIG. 3 is a diagram showing several elements of one embodiment of one network switch 20 of FIG. 1. Network switch 20 includes a console port 44, two data ports 46a and 46b, a memory 48, and a processor 50 coupled as shown. Memory 48 includes an access control list 58 that may be configured by console 30 to include those terminals 14 that may establish voice connections through analog voice bridge 18. In the particular embodiment shown, network switch 20 switches data packets at the network layer (layer 3) of the open system interconnect (OSI) model.

Network switch 20 restricts transmission of data packets between its associated secure network domain 16 and analog voice bridge 18 to only those data packets associated with digitized voice streams that are destined for transmission through analog voice bridge 18. In one embodiment, each network switch 20 restricts all data packets to analog voice bridge 18 that have not originated from a voice interface gateway 28 configured on its associated secure network domain 16. Thus in certain embodiments, security of the boundary formed by analog voice bridge 18 may be enhanced by restricting access from other nodes that may be coupled to its associated secure network domain 16.

Network switch 20 provides various functions for maintaining security of its respective secure network domain 16. In one embodiment for example, access control list 58 is configurable only by a console 30 coupled through console port 44. By limiting configuration only through console 30, configuration of access control list 44 from remotely coupled devices may be restricted. In this manner, illicit access across secure network domains 16 provided by reconfiguration of access control list 44 may be effectively mitigated or eliminated. Without this feature, for example, a particular node coupled to network switch 20 through its respective secure network domain 16 may be able to gain illicit access to the other secure network domain 16 by remotely configuring access control list 44 to allow unauthorized access to the other secure network domain 16 through analog voice bridge 18.

Network switch 20 uses access control list 58 to regulate access of terminals 14 to analog voice bridge 18. In one embodiment, network switch 20 implements a mandatory access control (MAC) such that only those terminals 14 previously registered in access control list 58 are allowed to place or receive intercom calls through analog voice bridge 18.

Figure 4:
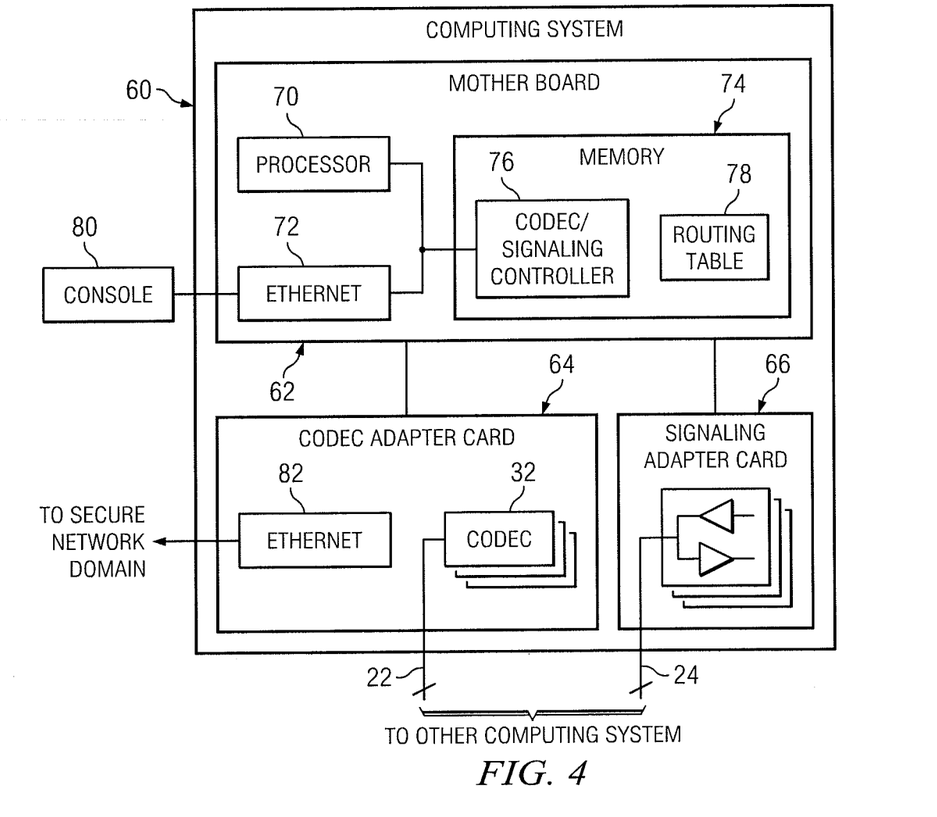
FIG. 4 is a diagram showing an example computing system that may be implemented with one or more codecs of FIG. 1.

FIG. 4 is a diagram showing an example computing system 60 that may be implemented with one or more codecs 32a of FIG. 1. Computing system 60 includes a motherboard 62 coupled to a codec adapter card 64 and a signaling adapter card 66 through a suitable type of computer bus, such as a peripheral component interconnect (PCI) or an industry standard architecture (ISA) computer bus. Motherboard 62 has a processor 70 coupled to an Ethernet port 72 and a memory 74 that stores a codec/signaling controller 76 and a routing table 78a. Ethernet port 72 is coupled to a console 80 for configuration of routing table 78. Although only one computing system 60 implemented with codec 32a is shown, it should be understood that codec 32b may be implemented in another computing system similar in design and construction to computing system 60 shown and described.

Processor 70 executes codec/signaling controller 76 to control codec adapter card 64 and signaling adapter card 66 for implementing the various features of analog voice bridge 18. In one embodiment, computing system 60 is a commercial-off-the-shelf computing system capable of operating with a standard operating system, such as a Unix, Linux, Windows, or Macintosh operating system. In a particular embodiment, computing system 60 is a commercially available computing system configured with multiple codecs 32a and marketed under the tradename "Mercury interface Unit", which is available from Trilogy Communications Limited, and located in Andover, Hampshire, United Kingdom.

Routing table 78 stores routing information about terminals 14 that communicate through analog voice bridge 18. Additionally, routing table 78 stores routing information about terminals 14 that communicate through analog voice bridge 18. Two computing systems 60 embodying each codec 32 of analog voice bridge 18 may have their own routing table 78 such that registration of a communication link between terminals 14a and 14b configured on differing secure network domains 16 may be conducted independently of one another. Routing tables 78 may be configured according to a positive inclusion policy. That is, the only voice connections allowed through analog voice bridge 18 are those that have been previously registered on the routing tables 78 of both computing systems 60 embodying codecs 32 of analog voice bridge 18.

In one embodiment, codec adapter card 64 may include one or more codecs 32 for providing multiple voice connections between secure network domains 16 simultaneously. Codec adapter card 64 also includes a dedicated Ethernet port 82 that receives and transmits digital voice packets from its respective secure network domain 16. Providing an Ethernet port 82 separate from Ethernet port 72 may provide certain advantages including separation of voice traffic from configuration data packets used to configure the operation of codec/signaling controller 76. Providing Ethernet port separately from Ethernet port 72 may also provide another advantage in that its coupling to codecs 32 may be provided without connection through the computing system's computer bus connectors that may otherwise reduce throughput and/or signal quality of voice signals transferred between codecs 32 and Ethernet port 72.

In one embodiment, routing table 78 is only locally configurable using console 80. That is, modification of routing table 78 may be restricted from other access points of computing system 60, such as Ethernet port 82 that would otherwise allow its modification through another node remotely configured on its associated secure network domain 16. In this manner, illicit access across secure network domains 16 enabled by modification of routing table 78 may be effectively mitigated or eliminated. Without this feature, for example, a particular node coupled to computing system 60 through its respective secure network domain 16b may be able to gain illicit access to the other secure network domain 16a by remotely configuring routing table 78 to allow unauthorized access to the other secure network domain 16b through analog voice bridge 18.

Signaling adapter card 66 includes one or more I/O ports 84 for transferring logic signals with signaling adapter card of its complementary computing system. Logic signals may include any suitable quantity and/or sequence of signals associated with voice connections across analog voice bridge 18, such as calling sequences associated with a conference call session, or push-to-talk signaling used within call sessions. For example, codec/signaling controller 76 may receive a call request from terminal 14 configured on secure network domain 16a requesting a conference call session with terminal 14 configured on secure network domain 16b. In response to the call request, codec/signaling controller 76 controls I/O ports 84 to generate logic signals that are transmitted to I/O ports 84 of its complementary computing system for setting up a conference call with terminal 14. Codec/signaling controller 76 of the complementary computing system 60 processes the received logic signals to initiate the conference call session with terminal 14. In one embodiment, generation of logic signals through I/O ports 84 is restricted to control only by codec/signaling controller 76. That is, the operation of I/O ports 84 may not be manipulated through instructions or messages received through Ethernet port 72, Ethernet port 82, or other communication interface provided on computing system 60. In this manner, the security boundary provided between secure network domains 16a and 16b may not be breeched by performing illicit call signaling techniques from one computing system 60 to the other.

Figure 5:
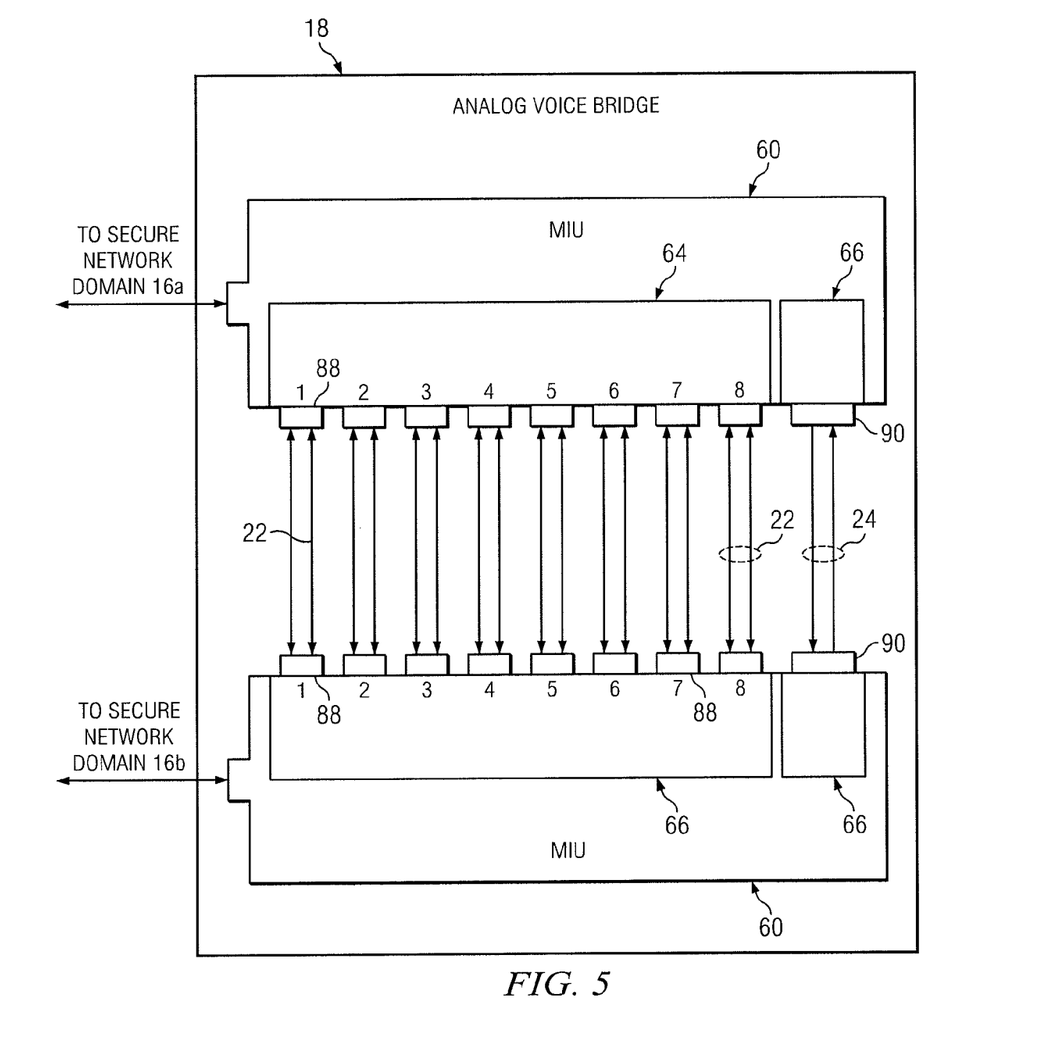
FIG. 5 is a schematic diagram showing one embodiment of multiple analog voice lines and signaling lines that may be configured to route analog voice signals and signaling, respectively between computing systems embodying the codecs of FIG. 1.

FIG. 5 is a schematic diagram showing one embodiment of multiple analog voice lines 22 and signaling lines 24 that may be configured to route analog voice signals and signaling, respectively between computing systems 60. Codec adapter card 64 and signaling adapter card 66 each include one or more connectors 88 and 90, respectively, for physical interconnection with analog voice lines 22 and signaling lines 24. In one embodiment, computing systems 60 embodying codecs 32 are configured in relatively close proximity to each other such that interconnection of analog voice lines 22 between computing systems 60 may be closely controlled. In one embodiment, analog voice lines 22 may be void of any active circuitry, such as busses, routers, or amplifiers that may increase their complexity and thus increase the possibility of an incorrect connection between computing systems 60. In another embodiment, analog voice lines 22 and signaling lines 24 are color coded to match a color coding scheme of their associated connectors 88 and 90. For the example shown in which codec adapter card includes eight connectors 88, each connector 88 of codec adapter card 64 may be labeled with one of a black, brown, red, orange, yellow, green, blue, or violet colored label. Correspondingly, each of eight analog voice lines 22 may be labeled with similar individual colored labels. Using this color coding scheme, the possibility of inadvertent mismatch of analog voice lines 22 between computing system 60 may be reduced or eliminated.

Modifications, additions, or omissions may be made to analog voice bridge 18 without departing from the scope of the disclosure. The components of analog voice bridge 18 may be integrated or separated. For example, the components of codec adapter card 64 and/or signaling adapter card 66 may be implemented on a separate circuit card as shown or may be implemented with the other Moreover, the operations of analog voice bridge 18 may be performed by more, fewer, or other components. For example, computing systems 60 may each be configured with a hardware of software firewall to further restrict access to analog voice lines 22 and/or signaling lines 24 between the two secure network domains 16a and 16b. Additionally, operations of codec/signaling controller 76 may be performed using any suitable logic comprising software, hardware, and/or other logic.

Figure 6:
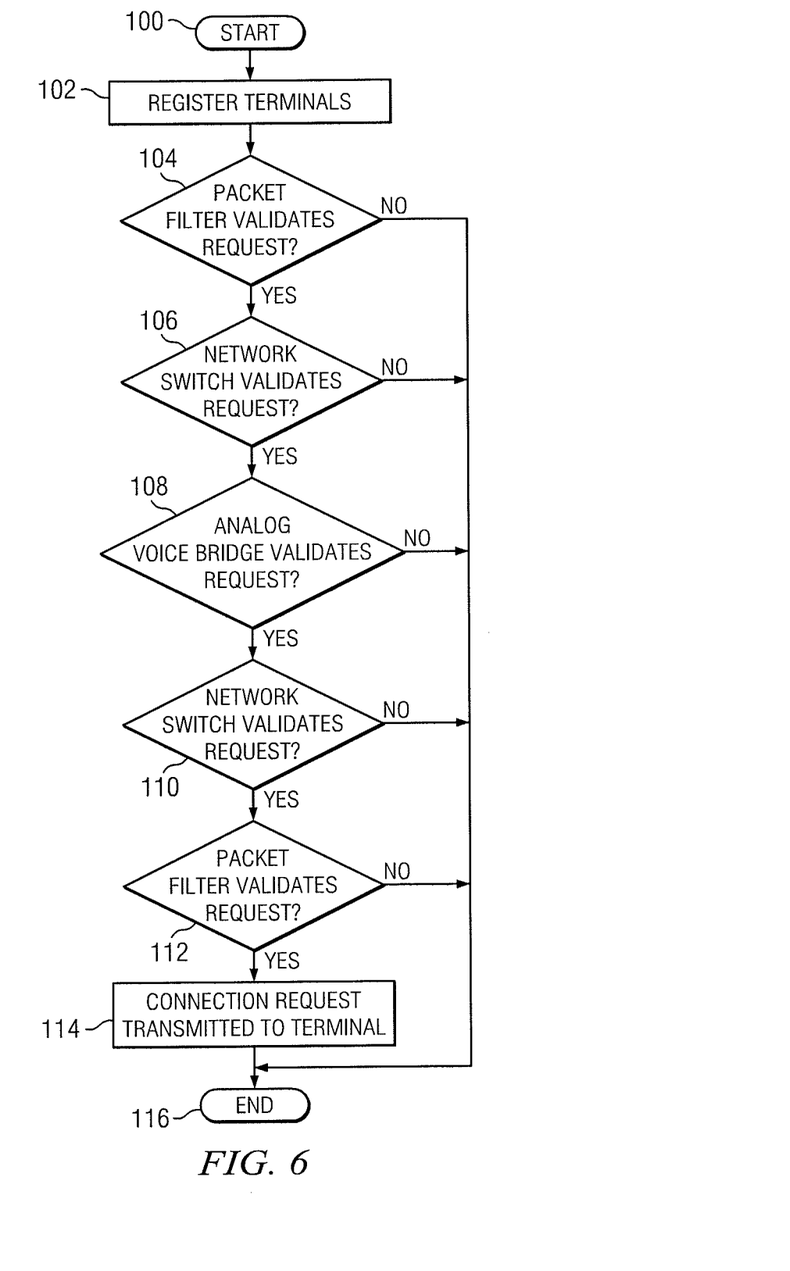
FIG. 6 is a flowchart showing one embodiment of a series of actions that may be performed by the multi-level security network of FIG. 1 to provide relatively secure voice communications across the security boundary formed by analog voice bridge.

FIG. 6 is a flowchart showing one embodiment of a series of actions that may be performed by multi-level security network 10 of FIG. 1 to provide relatively secure voice communications across the security boundary formed by analog voice bridge 18. In act 100, the process is initiated.

In act 102, terminals 14a and 14b configured on each secure network domain 16a and 16b are registered for use on multi-level security network 10. Each terminal 14a and 14b may be registered for use in their respective secure network domains 16a and 16b by adding information associated with each terminal 14a and 14b in access control list 58 of its associated network switch 20a and 20b and the access control list configured in its associated packet filter 26a and 26b. In one embodiment, terminals 14a and 14b may also be registered for use by adding information associated with each terminal 14a and 14b in routing tables 78 associated with both codecs 32 configured in analog voice bridge 18.

Registration of terminals 14a and 14b may include an authentication, authorization scheme for themselves as well as an authentication, authorization scheme for the user of terminals 14a and 14b. In one embodiment, authorization of the user of a terminal 14a or 14b may include validation of the user to use that particular terminal 14a or 14b. For example, a particular user having a security clearance level of secret may attempt to access a particular terminal 14a configured on a top secret secure network domain 16a. Thus, analog voice bridge 18 may reject the communication attempt due to lack of proper authorization of the user with that particular terminal 14a.

Registration of terminals 14a and 14b using routing tables 78 associated with each codec 32a and 32b provides a positive inclusion policy in which only voice sessions that have been previously registered may be allowed to communicate through analog voice bridge 18. Routing table 78 may include information associated with terminals 14a configured on its secure network domain 16a, and terminals 14b coupled to the other secure network domain 16b. In one embodiment, registration of terminals 14a and 14b on each routing table 78 is only modifiable through a locally configured console 80. That is, modification of routing tables 78 through a remote node that is remotely configured on secure network domain 16a or 16b may be restricted.

In one embodiment, routing tables 78 associated with each secure network domain 16a and 16b are manually modified by an information system security officer (ISSO) responsible for his or her secure network domain 16a or 16b. In this manner, registration of communication sessions through analog voice bridge 18 may be registered while maintaining physical separation of secure network domains 16a and 16b from one another. For example, it may be desired to provide a voice communication path from a terminal 14a configured on secure network domain 16a with another terminal 14b configured on the other secure network domain 16b. Following registration of terminals 14a and 14b with their associated secure network domains 16a and 16b as described with reference to act 102, the information system security officers responsible for secure network domain 16a may modify their associated routing table 78 and communicate the desired voice communication path to the other information system security officer responsible for the other secure network domain 16b. The other information system security officer may then modify the routing table 78 associated with secure network domain 16b in analog voice bridge 18.

In act 104, packet filter 26 validates a connection request from terminal 14a. Packet request may validate the connection request in any suitable manner. In one embodiment, packet filter 26a validates the connection request according to a type of terminal 14a issuing the request. For example, packet filter 26a may forward only those connection requests that have originated from a particular browser application executed on computing system 40 of terminal 14a. In another embodiment, packet filter 26a validates the connection request according to information associated with that particular terminal 14a stored in its access control list. If the connection request is validated by packet filter 26a, processing continues at act 106; otherwise the connection request is terminated and processing ends in act 116.

In act 106, network switch 20a receives the connection request from voice interface gateway 28a and validates the connection request. Network switch 20a validates the connection request in any suitable manner. In one embodiment, network switch 20a validates the connection request according to information stored in its access control list 58a associated with the terminal 14a issuing the connection request. If the connection request is validated by network switch 20a, processing continues at act 108; otherwise the connection request is terminated and processing ends in act 116.

In act 108, analog voice bridge 18 receives the connection request from network switch 20a and validates the connection request according to routing table 78 associated with secure network domain 16a. If the connection request is validated in routing table 78, computing system 60 transmits, using signaling lines 24, the connection request to the other computing system 60 of analog voice bridge 18. Computing system 60 may then verify that terminal 14a configured on its secure network domain 16a has been registered to communicate with other terminal 14b configured on secure network domain 16b. In one embodiment, computing systems 60 may use a proprietary signaling protocol to communicate through signaling lines 24. In this manner, spoofing of connection requests transmitted through analog voice bridge 18 may be reduced or eliminated. In another embodiment, signaling lines 24 are restricted to convey only information necessary for establishing, maintaining, or tearing down voice connections through analog voice bridge 18. Thus, signaling lines 24 may be restricted from transferring any information, such as data packets, from one computing system 60 to the other. If the connection request is validated by both computing systems 60, an unused analog voice line 22 may be allocated for conveying analog voice signals between terminals 14a and 14b in which processing continues at act 110. If the connection request is not validated, the connection request is terminated and processing ends in act 116.

In act 110, network switch 20b receives the connection request from analog voice bridge 18 and validates the connection request according to the receiving terminal 14b. In one embodiment, network switch 20b validates the connection request according to information stored in its access control list 58 associated with the terminal 14b coupled to its associated secure network domain 16b. If the connection request is validated by network switch 20b, processing continues at act 112; otherwise the connection request is terminated and processing ends in act 116.

In act 112, packet filter 26b validates a connection request received from network switch 20b. Packet filter 26b validates the connection request in any suitable manner. In one embodiment, packet filter 26b validates the connection request according to a type of receiving terminal 14b receiving the connection request. In another embodiment, packet filter 26b validates the connection request according to information associated with that particular terminal 14b stored in its access control list. If the connection request is validated by packet filter 26b, processing continues at act 114; otherwise the connection request is terminated and processing ends in act 116.

In act 114, terminal 14b receives a connection request from packet filter 26b. The connection request may alternatively be accepted or rejected by a user of terminal 14b. For example, the user of terminal 14b may reject the connection request by ignoring the connection request, or may accept the connection request by actuating terminal 14b in a manner that causes the various elements of multi-level security network 10 to establish a voice connection between terminal 14a and terminal 14b. Once the connection is established, users of terminals 14a and terminal 14b may conduct a secure voice communication with one another through analog voice bridge 18. When voice communication between terminals 14a and 14b are no longer needed or desired, the voice connection is removed and the process ends in act 116.

Any suitable type of connection may be established through multi-level security network 10. In one embodiment, terminal 14a may attempt to initiate an intercom connection in which ensuing voice messages with terminal 14b may be provided by a push-to-talk (PTT) voice message transmission scheme. Using the PTT voice message transmission scheme, voice messages originating at one terminal 14a or terminal 14b may be transmitted in half-duplex fashion to the other terminal 14b or 14a at the push of a button configured on the transmitting terminal 14a and 14b. In another embodiment, voice transmissions across multi-level security network 10 using a "hot mic" voice message transmission scheme may be restricted. The term "hot mic" voice message transmission scheme generally refers to transmission of voice messages over an intercom connection without manually operating a physical actuation device, such as a terminal mounted button. By restricting the use of "hot mic" voice message transmission schemes, therefore, the possibility of inadvertent voice transmission across security boundaries may be reduced or eliminated.

Modifications, additions, or omissions may be made to the method without departing from the scope of the disclosure. The method may include more, fewer, or other acts. For example, voice interface gateways 28a and 28a may include one or more voice compression/decompression algorithms for converting analog voice signals generated by terminals 14a and 14b into another form that may be transmitted over multi-level security network 10 at a reduced bandwidth. As another example, network switch 20a or 20b may execute any suitable auditing, monitoring, or accounting procedure for enhancing the security of voice communications transmitted between secure network domains 16a and 16b.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A communication method comprising:
    transferring, using a first network switch, data packets associated with a first voice packet stream between a first secure network domain and a first codec while restricting other data packets not associated with the first voice packet stream, the first voice packet stream encapsulating an analog voice signal;
    transferring, using an analog voice line, the analog voice signal between the first codec and a second codec; and
    transferring, using a second network switch, data packets associated with a second voice packet stream between a second secure network domain and the second codec while restricting other data packets not associated with the second voice packet stream, the second voice packet stream encapsulating the analog voice signal, the first secure network domain classified according to a first security level that differs from a second security level of the second secure network domain.

2. The communication method of claim 1, further comprising:
    restricting, using the first network switch, transfer of data packets not associated with the first voice packet stream between the first secure network domain and the first codec; and restricting, using the second network switch, transfer of data packets not associated with the second voice packet stream between the second secure network domain and the second codec.

3. The communication method of claim 1, further comprising restricting, using the first or second network switch, access of one or more terminals coupled to the first or second network switch according to an access control list stored in the first or second network switch, respectively.

4. The communication method of claim 1, further comprising:
restricting, using a packet filter coupled between one or more terminals and the first or second secure network domain, access to the one or more terminals according to an access control list stored in the packet filter, the access control list storing information associated with the one or more terminals.

5. The communication method of claim 4, further comprising restricting access, using the packet filter, to the one or more terminals according to their type.

6. The communication method of claim 4, further comprising:
establishing a voice connection through an analog voice bridge using a browser executed on one of the one or more terminals, wherein the analog voice bridge comprises the first and second codecs coupled together through an analog voice line.

7. The communication method of claim 4, wherein the one or more terminals are coupled to the first or second secure network through a wireless network.

8. The communication method of claim 1, further comprising restricting voice communication of one or more terminals coupled to the first secure network domain or the second secure network domain according to information associated with the one or more terminals stored in a routing table coupled to the first codec or the second codec.

9. The communication method of claim 1, wherein the first codec is embodied in a computing system that is independent of a second computing system embodying the second codec.

10. The communication method of claim 1, further comprising selectively monitoring voice communications through an analog voice bridge, wherein the analog voice bridge comprises the first and second codecs coupled together through an analog voice line.

11. The communication method of claim 1, further comprising auditing voice communications through an analog voice bridge, wherein the analog voice bridge comprises the first and second codecs coupled together through an analog voice line.

12. The communication method of claim 1, wherein the analog voice signal comprises an intercom connection.

13. A communication system comprising:
a first network switch to transfer data packets associated with a first voice packet stream between a first secure network domain and a first codec while restricting other data packets not associated with the first voice packet stream, the first voice packet stream encapsulating an analog voice signal;
an analog voice line to transfer the analog voice signal between the first codec and a second codec; and
a second network switch to transfer data packets associated with a second voice packet stream between a second secure network domain and the second codec while restricting other data packets not associated with the second voice packet stream, the second voice packet stream encapsulating the analog voice signal, the first secure network domain classified according to a first security level that differs from a second security level of the second secure network domain.

14. The communication system of claim 13, wherein the first network switch restricts transfer of data packets not associated with the first voice packet stream between the first secure network domain and the first codec; and
the second network switch restricts transfer of data packets not associated with the second voice packet stream between the second secure network domain and the second codec.

15. The communication system of claim 13, wherein the first or second network switch restricts access of one or more terminals coupled to the first or second network switch according to an access control list stored in the first or second network switch, respectively.

16. The communication system of claim 13, further comprising:
a packet filter coupled between one or more terminals and the first or second secure network domain to restrict access to the one or more terminals according to an access control list stored in the packet filter, the access control list storing information associated with the one or more terminals.

17. The communication system of claim 16, wherein the packet filter restricts access to the one or more terminals according to their type.

18. The communication system of claim 16, wherein the system is configured to establish a voice connection through an analog voice bridge using a browser executed on one of the one or more terminals, wherein the analog voice bridge comprises the first and second codecs coupled together through an analog voice line.

19. The communication system of claim 16, wherein the one or more terminals are coupled to the first or second secure network through a wireless network.

20. The communication system of claim 13, wherein the system is configured to restrict voice communication of one or more terminals coupled to the first secure network domain or the second secure network domain according to information associated with the one or more terminals stored in a routing table coupled to the first codec or the second codec.

21. The communication system of claim 13, wherein the first codec is embodied in a computing system that is independent of a second computing system embodying the second codec.

22. The communication system of claim 13, wherein the system is configured to selectively monitor voice communications through an analog voice bridge, wherein the analog voice bridge comprises the first and second codecs coupled together through an analog voice line.

23. The communication system of claim 13, wherein the system is configured to audit voice communications through an analog voice bridge, wherein the analog voice bridge comprises the first and second codecs coupled together through an analog voice line.

24. The communication system of claim 13, wherein the analog voice signal comprises an intercom connection.

* * * * *